Oct. 29, 1968
P. A. COIA
3,408,548
CONTROLLER INCLUDING A MULTIVIBRATOR-FED STEP MOTOR
Filed June 29, 1964
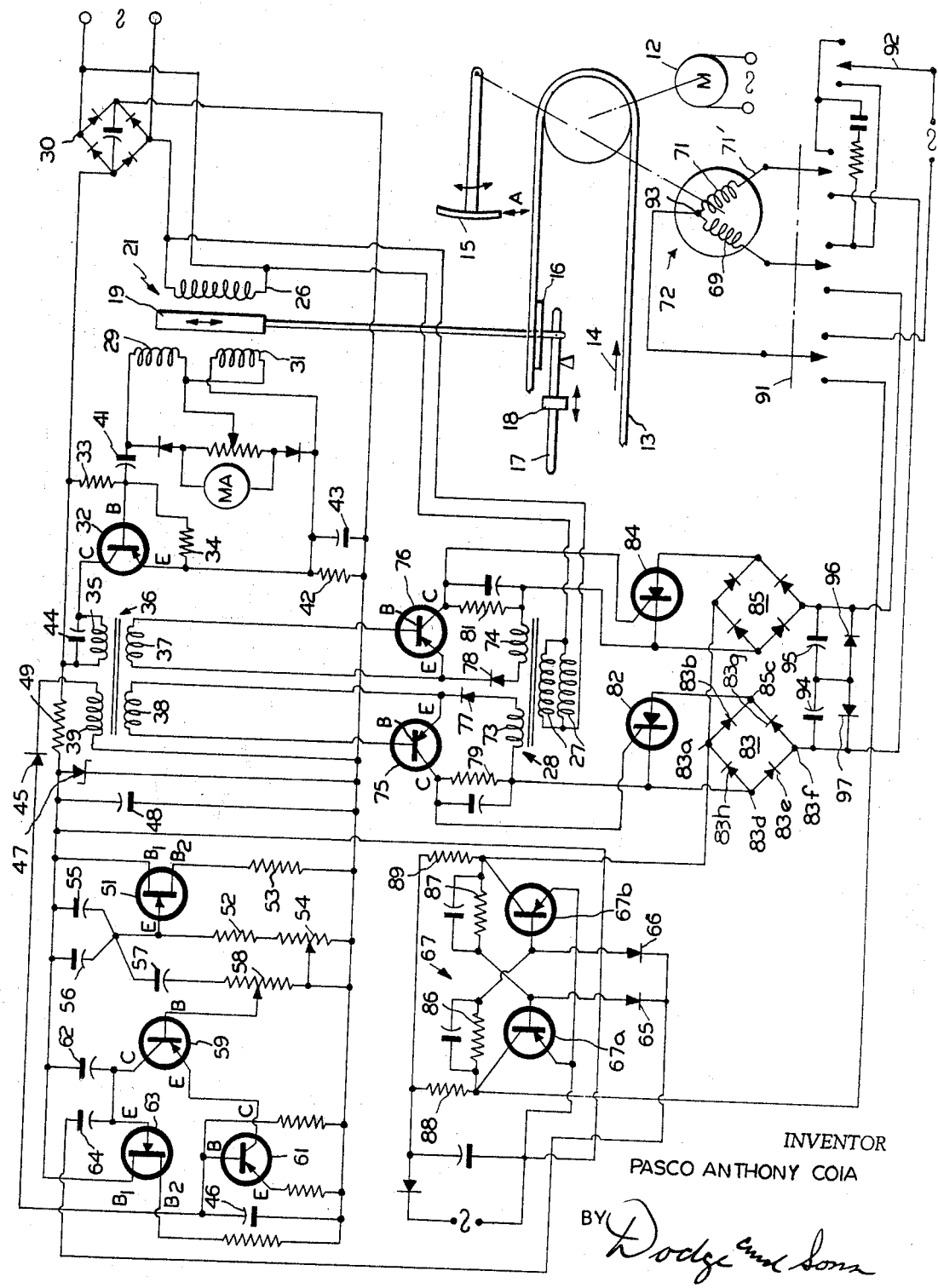
INVENTOR
PASCO ANTHONY COIA
BY Dodge and Sons
ATTORNEYS

United States Patent Office 3,408,548
Patented Oct. 29, 1968

3,408,548
CONTROLLER INCLUDING A MULTIVIBRATOR-FED STEP MOTOR
Pasco Anthony Coia, Providence, R.I., assignor to General Signal Corporation, a corporation of New York
Filed June 29, 1964, Ser. No. 378,553
7 Claims. (Cl. 318—28)

ABSTRACT OF THE DISCLOSURE

An electrical proportional speed floating controller includes means producing an AC error voltage signal whose amplitude is proportional to the magnitude of the departure of a measured variable from a desired value and whose phase displacement indicates whether the departure is positive or negative. A multivibrator is caused to produce power pulses to drive a stepping motor to drive the controller at a rate proportional to the magnitude of the error signal. Switch means direct the power pulses so as to drive the motor in opposite directions depending upon the direction of phase displacement of the error signal.

---

This invention relates to electric controllers and more particularly to proportional speed, floating controllers.

A typical application would be to an electric feed control for a belt conveyor. A linear voltage differential transformer (LVDT) is arranged with its movable core connected with a beam scale arranged to weigh the conveyed material. The LVDT produces a sinusoidal error voltage signal having an amplitude proportional to the deviation from the set point, i.e., the difference between desired weight and sensed weight and a phase displacement from the phase of the primary supply thereto whose direction indicates whether the deviation is positive or negative, i.e., whether the sensed weight is heavy or light.

This error signal is used to control movement of a motor-operated gate, the position of which determines the depth of material carried by the belt passing under the gate. A driving pulse is supplied to the motor through a control network in such a way that direction of motor operation is determined by the phase displacement of the error signal and the rate of pulse application and therefore the rate of motor movement is determined by the magnitude of the error signal. The control circuit also provides means by which the error signal may be modified to take into account the belt speed and the character of the conveyed material. Thus the response rate of the gate motor driven in response to the error signal may be made to accord with independent factors affecting the controlled operation.

The circuit components are preferably solid state components lending reliability and durability to a compact circuit.

The system features a novel transistor Eccles-Jordan multivibrator to supply large power pulses to the controlled gate motor. The multivibrator is triggered by means of a relatively low voltage pulse applied thereto by the error detecting circuit. The system also features a novel phase detector circuit to determine the direction of controlled motor movement as determined by the phase of the error signal with reference to a fixed phase reference signal.

One embodiment of the control as applied to a specific environment is shown in the single figure of the attached drawing.

An AC source is connected through a switch not shown to belt motor 12 to drive a feeder belt 13 in the direction of the arrow 14. Belt 13 carries a bed of material of depth A, as determined by the position of gate 15 from an inlet (not shown) to an outlet (not shown). The belt 13 passes over the platform 16 of a scale having, a beam 17 and an adjustable poise 18. The movement of the scale beam 17 is transmitted to the core 19 of linear voltage differential transformer 21 (henceforth termed LVDT).

An AC input voltage is supplied to the primary winding 26 of LVDT and to the primary windings 27 of the transformer 28. The secondary windings 29 and 31 of LVDT 21 are connected in series opposition to provide an AC error signal whose amplitude depends on the distance the core 19 is displaced from null position. This error signal is amplified in a transistor amplifier 32 having bias resistors 33 and 34 supplied with a DC voltage from full-wave rectifier bridge 30. The output of amplifier 32 is applied to the primary winding 35 of a transformer 36 having secondaries 37, 38 and 39. The error voltage is applied to the base of transistor amplifier 32 through capacitor 41. The emitter resistor 42 and shunting capacitor 43 provide DC negative feedback without AC degeneration. This latter increases the stability of transistor amplifier 32 as its temperature rises. Transformer primary 35 has one end connected with the collector of transistor amplifier 32 and its other end connected to the negative terminal of full-wave rectifier bridge 30. This error signal is a sine wave whose amplitude is related to error magnitude. Its phase is reversed 180° depending upon the direction of the error, i.e., the direction of movement of core 19. Capacitor 44 is a tuning capacitor for transformer primary 35.

The secondary winding 39 is connected to diode 45 and capacitor 46 which together form the half-wave rectifier filter section of an AC/DC converter. The output of rectifier bridge 30 is also connected across a voltage controlling Zener diode 47 and its filter capacitor 48 through a resistor 49. This arrangement provides DC voltage to a pulse generating means which comprises a unijunction transistor 51, resistors 52 and 53, potentiometer 54, capacitors 55 and 56 and coupling capacitor 57. A unijunction transistor is one having a very high resistance between E and $B_1$, until the voltage at E reaches a certain level at which time the resistance between E and $B_1$ becomes very low. This resistance remains low until the voltage between E and $B_1$ diminishes to zero. Assuming the capacitors 55 and 56 are discharged initially, a charge will build up in them at a rate dependent upon the magitude of resistor 52 and the setting of potentiometer 54 and voltage established by the Zener diode 47.

These capacitors are progressively charged toward the voltage established by the voltage regulating action of Zener diode 47. The peak voltage of the unijunction transistor 51 is, however, less than this regulated value. As transistor 51 becomes highly conductive when this peak voltage is reached, the resistance to current flow from E to $B_1$ falls to zero. The capacitors 55 and 56 are rapidly discharged through this path $EB_1$. During discharging of capacitors 55 and 56, coupling capacitor 57 couples a negative going pulse across potentiometer 58. Thus, when the unijunction transistor 51 is rendered conductive, a large negative going pulse appears across potentiometer 58, the wiper of which is connected to the base of a transistor amplifier 59. Transistor 59 has its emitter connected in series with the collector of transistor amplifier 61 whose emitter is in turn connected to the positive terminal of bridge 30. The base of transistor 61 is biased by the DC voltage produced by a half-wave rectifier filter network made up of diode 45 and capacitor 46. This voltage is a function of the error signal in the secondary 39 of transformer 36.

The pulse generator creates a pulsed voltage at the wiper of potentiometer 58 whose frequency may be varied by adjusting the setting of potentiometer 54. The amplitude of the pulse may be controlled by setting potentiometer 58. Thus a pulsed signal will be produced at the base of transistor 59. The frequency of this signal, determined by the setting of potentiometer 54, will have a desired relationship to belt speed. The amplitude of this signal will depend upon the magnitude of the error signal applied to the base of transistor 61 and upon the setting of potentiometer 58. This pulsed signal in the collector of transistor 59 charges a condenser 62. The potential accumulated in condenser 62 depends upon the peak voltage of a unijunction transistor 63. Each time capacitor 62 discharges through unijunction 63, a negative going pulse is coupled through capacitor 64 with the trigger diodes 65 and 66 of the bistable multivibrator 67.

The bistable multivibrator 67 supplies an output pulse each time the conductive states of transistors 67a and 67b are interchanged by the trigger diodes 65 and 66. This pulse causes stepping motor 72 to step and drive gate 15 up or down. The direction of rotation is determined by a novel phase detector controlled by the phase displacement of the error signal from that of the reference voltage which is the AC voltage applied to the primary of LVDT 21. Stepping motor 72 is of a special type sold by Superior Electric Co. under the designation type SS250.

This phase detector is as follows. Transformer primaries 27 produce signals which are in phase with one another in secondary windings 73 and 74. These windings 73 and 74 are connected across the emitter and collector of transistors 75 and 76 respectively, through half-wave rectifiers 77, 78 and resistors 79, 81. The bases of transistors 75 and 76 are respectively connected to one end of secondary windings 38 and 37 of transformer 36. These secondary windings 38 and 37 have their other ends connected to the emitters of transistors 75 and 76 and are arranged to produce signals which are 180° out of phase with one another.

Transistors 75 and 76 are so connected that when the waveform from secondary 73 or 74 at the collector of one is negative, with respect to the emitter the same condition exists in the other. Since positive pulses are excluded from reaching the emitters by rectifiers 77 and 78, the transistor can conduct and provide a signal across the collector load resistors 79 and 81 only when the phase reference voltage waveform applied to the base is negative. The out-of-phase signals applied to the bases of transistors 75, 76, will be negative going in one transistor when it is positive going in the other. When both the signal at the base and the waveform at the collector are negative with respect to the emitter, the transistor will conduct a pulse to collector. Thus only one transistor 75 or 76 can be rendered effective to transmit pulses only when the error is positive while the other transistor transmits pulses only when the error is negative. The pulses from transistor 75 control the gate electrode of a silicon controlled rectifier (SCR) 82 of the bridge 83. Transistor 76 controls SCR 84 of bridge 85.

The bistable multivibrator 67 supplies power pulses to the coils 69 and 71 of motor 72 to drive the gate 15 up or down to increase or decrease the volume of material conveyed. The multivibrator supplies large amounts of power to the motor 72, but is triggered to reverse between its stable states by relatively low power negative going pulses coupled thereto by coupling capacitor 64 when capacitor 62 is discharged by unijunction transistor 63. The R-C cross-coupling networks of the multivibrator 67 include large resistances 86 and 87. The load on the multivibrator includes large resistors 88 and 89, one connected in parallel with each motor coil. The special type stepping motor requires for operation that a power polarity reversal follow each power pulse. The motor is connected from collector to collector of transistors 67a, 67b, this in effect produces the polarity reversal on alternate pulses. Assume transistor 67a is on and 67b is off. The voltage from the collector of 67a to its emitter is practically zero. The voltage of collector of transistor 67b, it being off, would be negative (say —35 v.) if the motor coil was not connected to its emitter, so that the voltage measured from collector of 67a to collector of 67b would be the same magnitude and sense (—35 v.) with reference to the collector of 67a. If a signal pulse now causes 67c to cut off and 67b to turn on, the voltage at the collector of 67b is zero and that at the collector of 67a will be negative (—35 v.), and if the original reference point is kept, the voltage has now reversed its polarity, that is the voltage at 67b is (35 v.) higher than that at 67a. The reversed alternate polarity pulse is applied to inputs of both gate circuits (i.e., to bridges 83 and 85). Each gate circuit is connected to a winding of the stepper motor. The motor will be stepped forward or reverse depending upon which gate is opened by the phase detector. Assume that direction of the error causes the collector of transistor 75 to apply a signal to the control gate of SCR 82, a pulse will travel from multivibrator 67 to the motor coil 69 from the collector of 67b (assuming it to be the conducting one) to the junction 83a through diode 83b to junction 83c through SCR 82 to junction 83d, through diode 83e to junction 83f and on to terminal 71' of coil 71 through collector switch 91 and back from common 93 to the collector of 67a. Switch 91 is closed in the left hand position to connect the motor to the control circuit. In the mid-position switch 91 disconnects the motor 72 from the circuit. In the right hand portion switch 91 connects the motor 72 across an AC source and may be driven up or down by movement of switch 92 to the right or left. The next pulse from multivibrator 67 will come from the collector of 67a to common point 93 reversely through coil 71 and back to junction 83f of bridge 83, being blocked at 83e the signal will pass through 83g to junction 83c through SCR 82 in the same direction as the previous pulse to junction 83d through 83h to junction 83a and the collector of 67b. A similar circuit exists for successive pulses through bridge 85 when SCR 84 is the one receiving a gating signal at its gate. These pulses pass through coil 69. The operation of motor 72 requires the use of capacitor diode network made up of capacitors 94, 95 and diodes 96, 97. Assuming the multivibrator pulse has just passed through coil 71 toward junction 93 and that the multivibrator is changing to its other stable state, the energy then present in coil 69 flows back to capacitor 94 during the first half of the changeover. During the next half of the changeover this stored pulse is passed through coil 69 through diode 96 to the common to condition the motor to step completely. On the next changeover by the multivibrator 67 the energy in coil 71 will pass through coil 69 and charge capacitor 94 during the first half of changeover and on the second half of changeover the stored energy in 94 will pass through coils 69 and 71 to the junction 71'. This capacitor diode network is used to replace a single non-polarized condenser normally used in the inputs to motor 72.

Summary of operation

When the scale beam 17 is balanced, the LVDT core 19 is centered and no output appears in the LVDT's secondary. When the core 19 moves up or down in response to movement of the scale beam a sinusoidal error signal is delivered through the secondaries 29, 31. The amplitude of the wave corresponds to the degree of scale unbalance as indicated by movement of core 19. This signal is amplified by transistor 32 and applied to transformer primary 35. Secondary windings 38, 37 of transformer 35 provide sine waves which are 180° out of phase with one another. These waves in conjunction with the reference wave produced in windings 27 cause either transistor 75 or 76 to pass a signal through its collector to the gate of the silicon controlled rectifier to render it conductive and render its associated bridge 83 or 85 effective to pass pulses back and forth between the motor coils 69, 71 and multivibrator 67. Only one SCR 82 or 84 is conductive at any given time and then only when its gate is receiving a pulse from its transistor. If, while the SCR is passing a pulse from multivibrator, the gating pulse discontinues, the SCR will remain conducting until that multivibrator pulse has passed through the SCR. The time required for multivibrator changeover will permit the SCR to assume blocking position if the gating signal was lost during passage of the previous multivibrator pulse.

The error signal from amplifier 32 is also passed via transformer secondary 39, half-wave rectifier 45 and capacitor filter 46 to appear as a DC bias on the base of transistor 61. This transistor 61 is connected with its collector in series with the emitter of transistor 59. The base of transistor 59 receives a pulsing voltage from the wiper of potentiometer 58. This pulsing voltage is delivered to the potentiometer 58 by a coupling capacitor 57. A pair of condensers 55 and 56 are connected to be charged through resistor 52 and potentiometer 54. When their charge reaches an amount determined by the peak voltage of unijunction transistor 51, the capacitors 55 and 56 will be discharged producing a large negative going pulse, which is coupled through capacitor 57 with the potentiometer 58 and its wiper whereby a negative pulse is created at the base of transistor 59. Capacitor 62 is charged at a rate dependent upon the magnitude of error signal applied to base of transistor 61 and upon the amplitude and frequency of the sawtooth waveform generated by the pulse generator which are both applied to base of transistor 59. The frequency of pulses delivered to the multivibrator 67 by coupling capacitor 64 is determined by the time required to charge capacitor 62.

Potentiometer 54 may be manually adjusted so that the frequency of coupled pulses passed to potentiometer 58 has a desired relationship to belt speed. The frequency is higher for higher belt speeds. Potentiometer 58 may manually be adjusted to change the amplitude of pulsing wave. If the amplitude is large, capacitor 62 is charged at a higher rate, for any given frequency and magnitude of error signal, than would be the case if the amplitude were small. Thus, the rate at which gate 18 moves can be varied so that an error of a given magnitude can be corrected at either a high or slow rate. The rate selected will depend upon the character of the material conveyed and the rate of belt movement. If the belt speed is required to be variable over a wide range, the pulse generator could be replaced by a tachometer directly coupled to the belt and producing directly a frequency proportional to belt speed.

What is claimed is:
1. An electric proportional speed floating control comprising
  (a) a triggered transistor multivibrator of the Eccles-Jordan type having a load resistor connected electrically in series with the collector of each transistor;
  (b) controlled stepping motor means operable to control a measured variable and having two coils and a rotor stepped in one direction by a power pulse delivered to one coil by said multivibrator and in the reverse direction by a power pulse delivered to the other coil by said multivibrator;
  (c) a circuit connecting said coils electrically in parallel between said collectors;
  (d) switch means in each parallel connected branch;
  (e) means serving in response to a positive error to close one switch means and maintain the other open;
  (f) means serving in response to a negative error to close the other switch means and maintain said one switch means open;
  (g) means to produce an AC error signal proportional to the departure of the measured variable from a desired value; and
  (h) means applying trigger pulses to the multivibrator at a frequency proportional to the amplitude of said AC error signal.

2. The combination defined in claim 1 in which the means applying a triggering pulse comprises:
  (a) a source of DC potential;
  (b) a first capacitor to be charged therefrom;
  (c) means effective to supply pulsing charges to said capacitor from said DC source;
  (d) means to vary the size of said charging pulses proportionally to the measured magnitude of the error;
  (e) means to limit and then discharge the accumulated charge to said first capacitor; and
  (f) a second capacitor coupled with the first capacitor and transmitting a pulse, when the first capacitor is discharged, to said multivibrator.

3. The combination defined in claim 2 and;
  (a) means to vary the frequency of the charging pulses independently of the variation in response to error magnitude.

4. The combination defined in claim 2 and;
  (a) means to vary the amplitude of the charging pulses.

5. The combination defined in claim 2 and;
  (a) means to vary the frequency of the charging pulses independently of the variation in response to error magnitude; and
  (b) manually adjustable means to vary the amplitude of the charging pulses.

6. The combination defined in claim 2 in which the means to limit the charge accumulated in the first capacitor and to discharge the first capacitor comprises a unijunction transistor whose peak voltage equals the maximum charge to be accumulated in said capacitor and having its emitter connected to the charging connection of said first capacitor.

7. An electric proportional speed floating system comprising
  (a) means including a source of AC voltage to produce an AC error signal proportional to the departure of a measured variable from a desired value and a phase displacement indicative of whether the signal is positive or negative;
  (b) a first transformer having a primary winding connected to receive said error signal from said means;
  (c) said first transformer including first and second secondary windings connected 180° out of phase with each other;
  (d) a second transformer having a primary winding connected in circuit with said AC voltage source;
  (e) third and fourth secondary windings in said second transformer in which signals in phase with one another are produced;
  (f) first and second transistors;
  (g) a first circuit including means connecting one end of the third secondary winding to one end of said first secondary winding through a first half-wave rectifier, means connecting the other ends of said first and third secondary windings together through the base and collector of the first transistor, and means connecting the emitter of the first transistor to receive negative half-wave pulses through said first half-wave rectifier from said one end of the third secondary winding,
  (h) said first transistor producing an output signal at its collector only when the negative half-wave at its emitter is in phase with the negative portion of the wave form at the base of the first transistor;
  (i) a second circuit including means connecting one end of the fourth secondary winding to one end of the second secondary winding through a second half-wave rectifier, means connecting the other ends of the second and fourth secondary windings together through the base and collector of the second transistor, and means connecting the emitter of the second transistor to receive negative half-wave pulses through said second half-wave rectifier from said one end of the third secondary winding;

(j) said second transistor producing an output signal at its collector only when the negative half-wave at its emitter is in phase with the negative portion of the wave form at the base of the second transistor;

(k) a triggered transistor multivibrator of the Eccles-Jordan type having a load resistor connected electrically in series with the collector of each transistor thereof;

(l) controlled stepping motor means operable to control and said measured variable and having two coils and a rotor stepped in one direction by a power pulse delivered to one coil by said multivibrator and in the reverse direction by a power pulse delivered to the other coil by said multivibrator;

(m) a circuit connecting said coils electrically in parallel between the collectors of the multivibrator transistor;

(n) normally open switch means in each parallel connected branch;

(o) means serving in response to a signal from the collector of said first transistor to close one of said switch means;

(p) means serving in response to a signal from the collector of said second transistor to close the other of said switch means; and (q) means applying trigger pulses to said multivibrator at a frequency proportional to the amplitude of said AC error signal.

References Cited

UNITED STATES PATENTS

| | | | |
|---|---|---|---|
| 2,491,606 | 12/1949 | Dickey et al. | 313—20.715 |
| 2,495,844 | 1/1950 | Hornfeck | 318—20.715 |
| 2,532,297 | 12/1950 | Goertz | 318—20.850 |
| 2,611,812 | 9/1952 | Hornfeck | 318—20.715 |
| 2,774,019 | 12/1956 | Hornfeck | 318—20.715 |
| 3,008,072 | 11/1961 | Jenkins et al. | 318—20.390 |
| 3,286,144 | 11/1966 | Hill | 318—20.390 |

ORIS L. RADER, *Primary Examiner.*

GLEN R. SIMMONS, *Assistant Examiner.*

U.S. DEPARTMENT OF COMMERCE

PATENT OFFICE

UNITED STATES PATENT OFFICE
CERTIFICATE OF CORRECTION

Patent No. 3,408,548                          October 29, 1968

Pasco Anthony Coia

It is certified that error appears in the above identified patent and that said Letters Patent are hereby corrected as shown below:

Column 6, line 11, "to" should read -- in --. Column 7, line 10, cancel "and", first occurrence; lines 16 and 17, "transistor" should read -- transistors --.

Signed and sealed this 24th day of February 1970.

(SEAL)
Attest:

Edward M. Fletcher, Jr.                    WILLIAM E. SCHUYLER, JR.

Attesting Officer                                Commissioner of Patents